Aug. 10, 1948.  J. A. ROMINSKI  2,446,720
GAFF WEIGH HOOK
Filed July 19, 1946
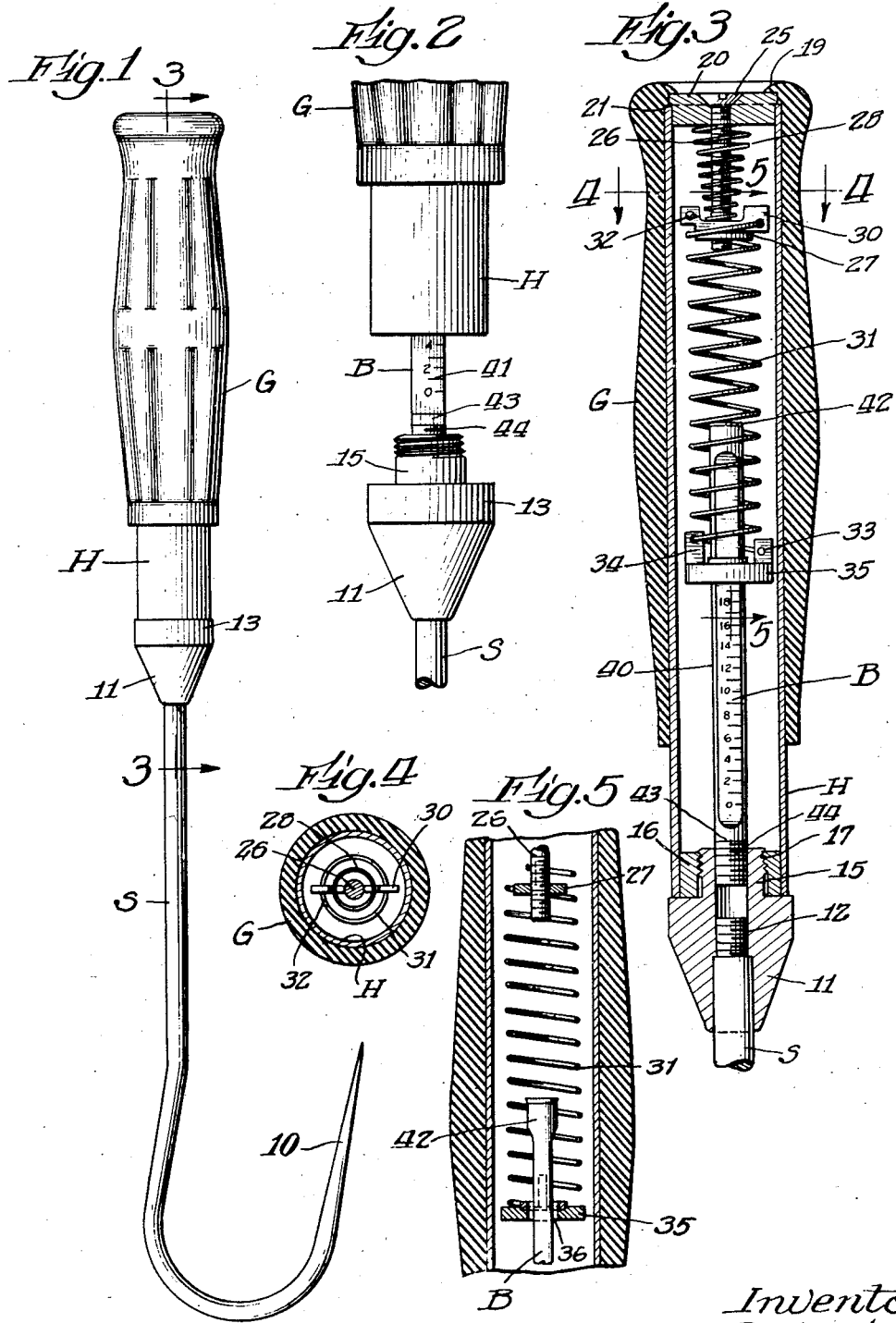
Inventor:
James A. Rominski
By Henning & Henning attys.

Patented Aug. 10, 1948

2,446,720

UNITED STATES PATENT OFFICE 2,446,720

GAFF-WEIGH HOOK

James A. Rominski, Chicago, Ill.

Application July 19, 1946, Serial No. 684,993

7 Claims. (Cl. 265—66)

My invention here is concerned with a dual-purpose gaff hook for use by fishermen in (1) landing the catch and (2) weighing same. As is well known, it is most desirable to ascertain the weight of a fish promptly upon its being caught. The present device incorporates in its handle a spring scale whereby to register the weight of the fish almost concurrently with its initial suspension from the hook.

The means herein to be described is simple and sturdy. As a gaff hook it functions the same as the usual implement provided for such purposes. As a weighing scale it also operates much the same as the usual spring balance. The present dual-purpose device, however, combines these separate functions into a single implement without loss of any advantage that is inherent in each.

A suggestive embodiment of my invention is set forth in the accompanying drawing wherein:

Fig. 1 is an elevational view of the gaff-weigh hook in its entirety;

Fig. 2 is a fragmentary detail in elevation of the hook shank disconnected from the handle to permit operation of the spring balance;

Fig. 3 is a longitudinal section, somewhat enlarged, through the handle, taken on line 3—3 of Fig. 1;

Fig. 4 is a transverse section through the handle, taken on line 4—4 of Fig. 3; and Fig. 5 is a longitudinal section through the handle, taken on line 5—5 of Fig. 3.

The implement comprises a shank S formed at one end into a hook 10 and at the other joined to a coupling head 11 as by a screw threaded connection 12. The head which may be exteriorly knurled at 13 to facilitate rotative manipulation is provided with an axially extending hollow boss 15 which is desirably threaded interiorly and exteriorly.

A tubular handle H mounts interiorly at its lower end an annular plug 16 which is inseparably secured in place as by a pressed fit. This plug which is hollow is interiorly threaded at 17 for coacting engagement with the exterior threads of the boss 15. By this arrangement the handle is adapted for releasable connection with the coupling head in response to rotary movement of one part relative to the other. A closure for the lower open end of the handle is thereby provided. Carried by the exterior surface of the tubular handle is a grip G of rubber or the like whose upper end is shown as inturned to overlie at 19 the periphery of a plug 20 which may be shouldered at 21 to engage the handle end when fitted thereinto and secured in place as by a pressed fit. In some such way as this I provide a closure for the upper end of the tubular handle.

Extending through an axial opening in the upper plug 20 is a screw, having, in engagement with the exterior face of the plug, a slotted head 25 and a threaded shank 26 which is disposed interiorly of the handle. This shank is operatively fitted within a compensator nut 27 against which bears one end of a tension spring 28 which is coiled around the bolt shank to engage at its opposite end the inner face of the upper plug 20. By some such means as this a frictional pressure is maintained against the nut sufficient to hold it in any desired adjusted position lengthwise of the bolt.

The compensator nut may be formed with diagonally opposite wings 30 through one of which is extended the proximate coil of a scale spring 31 whose end 32 is shown as securely hooked to the other wing. This spring extends lengthwise of the handle, spaced from its surrounding tubular walls, to connect at its lower end 33 with the wings 34 of a compensator collar 35 having an elongated center opening 36 through which is slidably fitted a flattened weight bar B whereon is marked a scale 41 to indicate pounds and fractions thereof. A limited sliding connection is provided between the weight bar and the collar. For this purpose the weight bar may be provided at its upper end with a head 42 engageable with the collar to serve as a stop when the bar is pulled downwardly in response to a suspended weight. Although freely slidable through the collar opening, the weight bar is held against rotation relative thereto by reason of the coacting cross sectional contours of these two parts. In its lower end portion 43 the form of the weight bar is cylindrical so as to carry thereon screw threads 44 which are adapted to engage with the interior threads of the plug boss 15 with which an inseparable connection may thereby be maintained.

In use as a gaff hook, the coupling head 11 remains connected to the handle with whose lower end it abuts to prevent any relative movement therebetween. In this position of the parts, the weight bar is shifted axially within the handle (see Fig. 3) so as to free the scale spring from any load except that of the collar 35 at its lower end. With the shank S thus firmly joined to the handle, the implement may be operated the same as any gaff hook.

To use as a weighing scale, the coupling head is unscrewed from the handle, preferably while the fish is still impaled on the hook. When disconnected, the handle is held vertically, allowing the coupling head to separate from the lower end of the handle for a short distance. In moving axially away from the handle, the coupling head draws with it the weight bar to the extent permitted by (1) its limited sliding connection with the collar 35 and (2) elongation of the scale spring 31 in response to the weight of the fish which is suspended from the gaff hook. The weight of the fish may then be accurately and quickly ascertained by reading the scale marking which is positioned opposite the lower end of the handle.

It will be noted that the handle chamber wherein the spring balance is contained is normally maintained closed at opposite ends by the two tight-fitting plugs which serve effectually to prevent water from entering therein. Also, adjustment of the spring balance may be made by the simple expedient of rotating the screw 26 (with the aid of a screw driver, coin, etc.) to whatever extent is necessary to bring the scale zero mark opposite the lower end of the handle. This operation, while infrequent, is important to assure accuracy in registration of the scale markings, and once a correct adjustment is made the friction applied by the tension spring 28 will suffice to prevent any further movement.

I claim:

1. A gaff-weigh hook in which is combined a hollow handle, a shank formed into a hook at one end, a coupling providing a separable connection between the opposite shank end and one end of the handle, a weight bar affixed at one end to the coupling and extending therefrom axially within the handle, a scale spring coiled to extend axially within the handle, means connecting the upper end of the spring to the handle, and means forming a limited sliding connection between the opposite spring end and the weight bar such that, with the coupling separated from the handle, any load on the hook is transmitted directly to the weight bar to be sustained by the scale spring.

2. A gaff-weigh hook in which is combined a hollow handle, a shank formed into a hook at one end, a coupling providing a separable connection between the opposite shank end and one end of the handle, a weight bar affixed at one end of the coupling and extending therefrom axially within the handle, a scale spring coiled to extend axially within the handle, an adjusting screw manipulatable from the upper end of the handle in rotatable connection with the upper end of the spring, and means forming a limited sliding connection between the lower spring end and the weight bar such that, with the coupling separated from the handle, any load on the hook is transmitted directly to the weight bar to be sustained by the scale spring.

3. A gaff-weigh hook in which is combined a hollow handle, a scale spring suspended from the upper end of the handle, a weight bar suspended from the lower end of the spring, a coupling rigid with the weight bar and separably connected to lower end of the handle, and a gaff hook shank rigidly supported from the coupling adapted, when the coupling is separated from the handle, to transmit any load carried by the gaff hook to the weight bar for sustention by the spring.

4. A gaff-weigh hook in which is combined a hollow handle, a closure affixed to the upper end of the handle, a coiled spring extending lengthwise within the handle, means adjustably connecting one spring end to the closure, a coupling separably affixed to the lower handle end and providing a closure therefor, a gaff hook rigidly connected to the coupling and extending therefrom away from the handle, a weight bar connected to the coupling and extending therefrom into the handle and interiorly of the spring therewithin, and means forming a non-rotatable connection between the weight bar and the spring such that, with the coupling separated from the handle, any load carried by the gaff hook is transmitted therefrom directly to the weight bar for sustention by the spring.

5. A gaff-weigh hook in which is combined a hollow handle, closed at its upper end, a coiled spring extending lengthwise within the handle, means adjustably connecting one spring end to the closed end of the handle, a tension device for resisting movement of the adjusting means, a coupling separably affixed to the opposite open end of the handle to provide a closure therefor, a gaff hook rigidly connected to the coupling and extending therefrom away from the handle, a weight bar connected to the coupling and extending therefrom into the handle, and means forming a nonrotatable connection between the weight bar and the spring such that, with the coupling separated from the handle, any load carried by the gaff hook is transmitted therefrom directly to the weight bar for sustention by the spring.

6. In combination, a hollow handle open at one end, a coupling separably affixed to the handle at its open end, a gaff hook and a weight bar extended oppositely and fixedly from the coupling, the former exteriorly of the handle and the latter interiorly thereof, and a scale spring resiliently connecting the weight bar to the handle.

7. In combination, a hollow handle open at one end, a coupling separably affixed to the handle at its open end, a gaff hook and a weight bar rigidly secured to the coupling and extended oppositely therefrom, the latter to lie interiorly of the handle, and a scale spring secured to the handle and in limited sliding connection with the weight bar providing a resilient sustention for the latter.

JAMES A. ROMINSKI.

REFERENCES CITED

The following references are of record in the file of this patent:

UNITED STATES PATENTS

| Number | Name | Date |
|---|---|---|
| 452,278 | McIlvaine | May 12, 1891 |
| 1,255,269 | Zinkiewiez | Feb. 5, 1918 |
| 2,009,363 | Scheurer | July 23, 1935 |
| 2,129,469 | Hedges | Sept. 6, 1938 |